Patented Oct. 14, 1924.

1,511,762

UNITED STATES PATENT OFFICE.

JACOB CASPER HUTZELMAN, OF GLENDALE, OHIO.

HONEYCOMB STERILIZER.

No Drawing. Continuation of application Serial No. 493,645, filed August 19, 1921. This application filed April 5, 1924. Serial No. 704,495.

*To all whom it may concern:*

Be it known that I, JACOB C. HUTZELMAN, residing at Glendale, Ohio, a citizen of the United States, have invented certain new and useful Improvements in Honeycomb Sterilizers, of which the following is a specification.

The object of my invention is to render inocuous honeycomb which has been infected by the disease of foul brood, and particularly American foul brood, so that the honeycomb may be used with perfect safety by the bees, and to do this by means that will be inexpensive. My invention involves the use of a substance in the form of a solution which has the property of rendering accessible to infected portions of the comb of a germicide, or a substance having germicidal properties, so that there may be direct application of the germicide to the means of infection and the destruction thereof and sterilization of the comb may be effected and no residuum of odor or other condition will be left which would be dangerous, or offensive, to the bees. My invention consists in whatever is described by or is included within the terms or scope of the appended claims.

I have found that a solution containing alcohol and formaldehyde perfectly achieves the object of my invention. When the infected comb is treated, as by immersing it in a solution of alcohol and formaldehyde, since alcohol is of low surface tension it readily enters and thoroughly permeates the cells, and alcohol being a solvent of wax opens up the latter to access of the formaldehyde in the solution. Not only does the beeswax absorb the solution, but the solution penetrates propolis which is rendered semiliquid, propolis being a resinous substance; pollen in the cells is penetrated; the characteristic ropiness of larvæ having the disease is absent, and after drying such larvæ are in a hardened condition so that they can readily be removed from the cell walls, and they are no longer repulsive to the bees which will remove them as so much inert matter; surfaces wet with honey are disinfected, because honey is miscible with the solution; and the alcohol and formaldehyde being volatile at ordinary temperatures they evaporate from the honeycomb, and hence, no residuum of the treatment remains and the honeycomb is acceptable to the bees.

My solution in what I now consider its simplest and most satisfactory form consists of formaldehyde which is the germicide or disinfectant and alcohol of a pure grade, preferably grain alcohol, the alcohol being the vehicle or medium by which the penetration or access of the germicide to the diseased or infected portions of the comb is accomplished. The formaldehyde in the solution is preferably 20%, but, of course, I do not restrict myself to any particular percentage or proportion. The formaldehyde which I prefer to use is the commercial solution which contains about 38% of formaldehyde in water.

With such a solution as that of alcohol and formaldehyde the diseased combs are treated by being immersed in the solution in a suitable tank or receptacle, enough of the solution being employed to cover the combs completely. The duration of the immersion should be from twelve to forty eight hours according to the condition of the comb. Extracting combs or combs containing no scales or dead larvæ need be immersed no longer than twelve hours. Brood combs containing dead brood or scales may require forty eight hours immersion. Before immersing the combs, honey therein should be removed so that there may be no likelihood that the combs when removed from the solution will be sticky and fail to dry and therefore requiring further treatment as by rinsing in clean water to remove any adhering honey. The same solution may be used over and over again. The loss by evaporation is very small.

Not only does my solution have most remarkable disinfecting effect upon diseased honey comb without any injury to the comb or any after effects which would be obnoxious to the bees but it has no hurtful effect upon reinforcing wires commonly used with the frames nor upon the wood of which the frame bars are made and too the cost of the treatment is very small. Prior to my invention there was no known method of disinfecting combs affected with American foul brood and the combs either had to be burned outright or melted up for reconversion of the wax back into foundation both of which procedures were wasteful and expensive. A frame with a full sheet of foundation at the present time is worth twenty cents and the foundation of course, is simply the starter for the bees who must spend their time and energy in drawing it out into combs and sometimes they will refuse to do that work. An old comb no matter how badly diseased can be treated by means of my solution and placed in a condition which will be acceptable to the bees and which they will accept when they would refuse foundation, at a cost of between three and four cents.

This application is a continuation of my application No. 493,645 filed August 19, 1921.

What I claim is:

1. A preparation for sterilizing honeycomb infected with the disease known as foul brood comprising a volatile solvent having the property of penetration of the disease-infected honeycomb and formaldehyde.

2. A preparation for sterilizing honeycomb infected with the disease known as foul brood comprising in solution a medium having the property of penetration of the disease infected honeycomb and a germicide, the penetrant being alcohol and the germicide being formaldehyde.

3. A liquid for sterilizing honeycomb infected with the disease of foul brood comprising alcohol and a disinfectant soluble in alcohol and volatile at ordinary temperatures.

In testimony whereof I hereunto affix my signature.

JACOB CASPER HUTZELMAN.